(12) United States Patent
Myllymäki

(10) Patent No.: US 6,440,479 B1
(45) Date of Patent: Aug. 27, 2002

(54) PROCESSING OF FLAXSEED

(75) Inventor: Olavi Myllymäki, Espoo (FI)

(73) Assignees: HK Ruokatalo OYJ, Vantaa; Elixi Oil Oy, Somero, both of (FI)

(*) Notice: Subject to any disclaimer, the term of this patent is extended or adjusted under 35 U.S.C. 154(b) by 0 days.

(21) Appl. No.: 09/806,524

(22) PCT Filed: Oct. 1, 1999

(86) PCT No.: PCT/FI99/00811
§ 371 (c)(1),
(2), (4) Date: May 14, 2001

(87) PCT Pub. No.: WO00/20119
PCT Pub. Date: Apr. 13, 2000

(30) Foreign Application Priority Data

Oct. 1, 1998 (FI) ................................................. 982125

(51) Int. Cl.$^7$ ................................................. A23L 1/10
(52) U.S. Cl. ................................................. 426/483
(58) Field of Search .................... 426/52, 258, 288, 426/629, 482, 483, 484, 489; 99/623, 568

(56) References Cited

U.S. PATENT DOCUMENTS

| | | |
|---|---|---|
| 4,857,326 A | 8/1989 | Stitt |
| 5,069,903 A | 12/1991 | Stitt |
| 5,612,974 A | 3/1997 | Leach |
| 5,656,312 A | 8/1997 | Erasmus et al. |

FOREIGN PATENT DOCUMENTS

| | | |
|---|---|---|
| CA | 2167951 A1 | 7/1997 |
| EP | 0 321 783 A2 | 6/1989 |

OTHER PUBLICATIONS

W. Steve Cui, Flaxseed: A functional food for the 21st Century, Canadian Chemical News, May 1998, pp. 19–20, Canada.

J.F. Carter, Potential of Flaxseed and Flaxseed Oil in Baked Goods and Other Products in Human Nutrition, Cereal Foods World, Oct. 1993, pp. 753–759, v. 38, No 10., American Association of Cereal Chemists, Inc., USA.

P.K.J.P.D. Wanasundara et al., Removal of flaxseed mucilage by chemical and enzymatic treatments, Food Chemistry, pp. 47–55, v. 59, No. 1, Elsevier Science Ltd., Great Britain. (Jan. 1997).

Derwent Abstr. No. 92–428802, Abstract of JP 4325060 Nov. 13, 1992.

Derwent Abstr. No. 95–100745, Abstract of HU 66713 (Dec. 28, 1994).

Frosti Abstract No. 269523, Fleischerei, 42(9), pp. 624–628, Sep. 1991.

*Primary Examiner*—Keith Hendricks
(74) *Attorney, Agent, or Firm*—Rothwell, Figg, Ernst & Manbeck

(57) ABSTRACT

Flaxseed husk is removed from flaxseed core by abrasion. The outer husk portion firstly removed by abrasion is separated as a mucilage fraction and a subsequently removed inner portion is separated as a fiber fraction. The fiber fraction is particularly rich in lignans.

19 Claims, No Drawings

PROCESSING OF FLAXSEED

This application is a 371 of PCT/FI99/00811, filed Oct. 01, 1999

TECHNOLOGICAL BACKGROUND

The invention relates to the processing of flaxseed (Linum sp.) in order to produce a food supplement.

The flaxseed husk consists of three separate anatomic parts. The outer part consists of a water-soluble mucilage, the epidermic layer. Under the mucilage, there is the actual husk substance, the spernoderme, consisting of four layers. The inner husk surface is the endosperme, and the seed core consists of the cotyledon, which accounts for about half of the weight of the seed. The major portion of the oil and protein of the seed is located in the cotyledon. Seeds have been used as such or in a ground form in animal feed and human nutrition. The mucilage separated from the husk has also been used in medicinal and cosmetic products.

Flaxseed has also been husked in order to separate the husk portion from the inner portion (Wanasundra & Shahidi, Food Chem, 59 (1997) 47–55). Nevertheless, husking is a laborious and awkward process due particularly to the seed shape. Abrasive methods have been implemented in the husking.

Oil can be separated from flaxseed by pressing or extracting. The solid residue has been mainly used as an animal feed. It has been generally considered inapt for use as a foodstuff (Oomah & Mazza, Food. Chem., 48 (1993), 109–114), but has been used all the same, especially in bakery products. Its use is restricted especially by the flavour and colour changes in the foodstuff, which are felt to be unpleasant.

Flaxseed also contains lignans in an amount of 80–370 mg/100 g (Mazur et al., Anal. Biochem., 233 (1996) 169–180). In nutrition, lignans have proved to provide health benefits, i.a. anti-carcinogenic effects.

GENERAL DESCRIPTION OF THE INVENTION

A method has now been found in which the husk layer is removed from whole flaxseed and the husk is subsequently divided into a firstly removed mucilage fraction and a secondly removed fibre fraction. The mucilage fraction comprises the outermost husk layers and is rich in water-dispersible carbohydrates (mucilage). The fibre fraction comprises the inner husk layers and is particularly rich in fibres and lignans. The abrasion can be performed in a mill specifically equipped with millstones.

The husk removing method of the invention serves to detach separate fractions suitable for different purposes of use in one single process.

A method has now also been found, in which flaxseed solid substance obtained by separating oil from the seed is bleached by treating it with a mixture of water and alcohol. The bleaching mixture may contain hydrogen peroxide in addition. Husks or husk fractions separated from whole seeds can also be bleached with the bleaching method of the invention.

The bleaching method of the invention yields a product, which, used as a food supplement, causes less changes in colour and flavour than a non-processed solid substance does.

DETAILED DESCRIPTION OF THE INVENTION

The outermost flaxseed layer comprises principally water-soluble carbohydrates and forms the flaxseed mucilage. Under this, there is a layer comprising mainly fibres. When a whole unbroken flaxseed is abrased, the outer layer is first removed. This layer is separated as a mucilage fraction. Then the inner layer comes off, being separated as a fibre fraction. This fraction is also rich in lignans. The remainder comprises the inner seed portion, which is rich in oil and proteins. The inner portion accounts for approximately half of the weight of the seed.

The mucilage fraction is usable in foodstuffs especially as a viscosity-increasing agent in breads, for instance. The mucilage fraction is also usable in cosmetic and medicinal products. The Theological behaviour of the mucilage fraction is similar to that of arabic gum.

The mucilage fraction accounts for about 0.5–10% of the weight of the seed, such as 5–8%. The mucilage fraction draws along some of the inner portion of the husk. The fibre fraction is usable as a food supplement particularly when an increase in fibres and lignans is desired. Lignans have proved to provide health benefits. They seem to act as anti-carcinogenes, among other things. The fibre fraction naturally comprises a certain amount of oil. The oil can be removed by means of hexane for instance. A fraction particularly rich in fibres can also be separated from the fibre fraction. A lignan concentrate can be further produced from the fibre fraction e.g. by screening or grading, especially if the oil is first removed. Lignan can be concentrated also by means of extraction.

The fibre fraction accounts for about 20–70%, such as 30–50%, especially 35–45% of the weight of the seed.

Oil can be separated from the inner part of the seed, the residue being rich in proteins. A protein part with a particularly high, up to 70% protein content, and a mucilage fraction can be further separated from the residue.

The abrasion is performed by seeking to maintain the inner part of the seed as complete as possible to allow it to be separated from the abrased powder. The abrasion can be performed using commonly used abrasing devices. The devices can be modified rice polishing devices, for instance. The abrasion is performed by seeking to detach the husk portion as completely as possible, while removing only a minimum of the inner portion. The abrasion can be performed as a continuous process.

The seeds can be abrased for instance in a mill equipped with millstones. The rough surfaces of the millstones abrase the seeds at a given rate, preferably for about 1–3 minutes. The abrased powder has been found to have a particularly high lignan content after an abrasion period of about 1 minute.

The fibre fraction is a brownish powder. It can be bleached and simultaneously deflavoured, degreased and upgraded.

In the bleaching, the powder is moisturised with water, the ratio of water to powder varying e.g. in the range from 1:1 to 3:1. Enzymes such as lipase or protease can be added to the water. The water is allowed to act for e.g. 0.5–12 h, and then the paste is homogenised in alcohol, such as C1–C5 alcohol, especially ethanol or isopropanol, particularly in isopropanol. The alcohol amount is e.g. 2–5 times the powder amount. The homogenised alcohol-containing suspension is separated from the solution e.g. by filtering or centrifugating. The separated powder is washed e.g. with a 2–6-fold alcohol amount, and after this the suspension is preferably filtered and centrifugated. The alcoholic mass is dried e.g. at 20–90° C. The dried paste is ground or granulated to the desired grain size if necessary.

The alcohol breaks down the viscosity generated by the alcohol-insoluble but water-soluble carbohydrate constituent. This makes it easy to homogenise the paste to a non-viscous suspension and to perform the mechanical separating treatments of the suspension, such as filtering and centrifugation. The water treatment results in the solid structure opening up so that the major portion of the remaining oil in the paste is removed during the water-alcohol treatment. The more finely ground the powder, the stronger the effect. The alcohol added after the water treatment serves to precipitate the water-soluble carbohydrate, detaching it from the surrounding matrix. This allows for instance the dry product to be concentrated into a water-soluble component by mechanical means, such as grading.

The bleaching also removes cyanogens from the product.

A better result than with mere water-alcohol treatment is achieved by adding e.g. 2–7% of hydrogen peroxide to the aqueous solution at the elutriation stage. Hydrogen peroxide added before alcohol detaches mucilages from the surface efficiently. Before the bleaching, the powder can be thermally treated in order to inactivate any enzyme activity affecting the flavour. The temperature range may be e.g. 40–80° C. and the treatment period e.g. 0.5–2 h. The treatment can be performed in vacuum. Besides inactivating enzymes, the temperature and possible vacuum have the joint effect of removing low-molecular compounds affecting the taste.

A solid residue remaining after oil has been separated from whole flaxseed (flaxseed groats), especially a residue obtained by pressing, can also be bleached with the method of the invention. The groats are preferably ground before the bleaching e.g. by means of an emery mill with a pair of millstones.

EXAMPLE 1

A device designed for oat abrasion was used in the flaxseed abrasion. The seeds were abrased between the millstones and the metal mesh in a batch device (batches of 80 g) equipped with two millstones. At the end of the abrasion, the seeds were removed from the device through a hatch at the mesh bottom. During the process, the abrased powder passed through the mesh into a receiver. Table 1 shows the abrased fraction yield and the protein, fat and lignan concentrations as a function of abrasion time.

TABLE 1

Abrased laxseed (*Linum usitatissimum*, Helmi ssp.) powder yield and protein, fat and lignan concentration calculated on the dry substance.

| Abrasion time (min) | Protein (% d.s.) | Fat (% d.s.) | Lignan mg/100 g | Yield (%) |
|---|---|---|---|---|
| 1 | 12 | 18 | 1480 | 4 |
| 2 | 15 | 27 | 1360 | 9 |
| 3 | 17 | 29 | 1230 | 12 |
| 4 | 18 | 31 | 1070 | 16 |
| 5 | 19 | 34 | 1070 | 18 |
| 6 | 19 | 34 | 960 | 21 |
| 7 | 19 | 36 | 1030 | 22 |
| 8 | 20 | 36 | 800 | 24 |

The powder obtained is usable as a reactant in further lignin concentration. By extracting the oil from the abrased powder e.g. by hexane extraction, the lignin concentration of the powder will increase by an amount equal to the oil content, i.e. by 18% after 1 minute of abrasion. The powder can be further bleached for instance as described in example 2.

EXAMPLE 2

Flaxseed groats obtained in a cold-drawing process were bleached. The groats were subjected to thermal treatment in order to inactivate any enzyme activity affecting the flavour of the groats. The best sensory result was obtained by thermally treating the groats for 1 h in vacuum at 60° C. The dark brown groats obtained were elutriated in water at room temperature, forming a paste-like powder. After a settling of about 0.5–2 hours the paste-like powder was elutriated in isopropanol at a ratio of 1.2–3 (w/w). The crushed flaxseed suspension obtained was filtrated in vacuum. The deposit obtained, i.e. the filterpress cake, was washed during homogenisation in isopropanol, was refiltered in vacuum or centifugated in a decanter centrifuge. The filtrated powder was dried at room temperature or using a closed drying technique, allowing isopropanol to be recovered.

A better result than the one obtained with mere water-alcohol treatment was obtained by adding hydrogen peroxide to the aqueous solution at the elutriation stage. A very light powder was obtained by elutriating the groats in an aqueous solution with a 4–5% hydrogen peroxide content. After an elutriation time of 0.5–2 h the paste-like powder was homogenised in a double amount of isopropanol, filtered in vacuum, washed in isopropanol and refiltered. The filtered powder was dried.

A product particularly rich in proteins was obtained when isopropanol accounted for 50% of the solution and peroxide for about 5% of the solution.

What is claimed is:

1. A method for removing flaxseed husk from flaxseed core by abrasion, wherein a firstly removed outer portion of the husk is separated as a mucilage fraction and then a secondly removed inner portion is separated as a fibre fraction.

2. A method as defined in claim 1, in which the separated mucilage fraction accounts for 3–10%, of the weight of the seed.

3. A method as defined in claim 1, in which the separated fibre fraction accounts for 20–70%, of the weight of the seed.

4. A method as defined in claim 1, in which a high-fibre fraction is further separated from the fibre faction.

5. A method as defined in claim 1, in which a lignan fraction is further separated from the fibre faction.

6. A method as defined in claim 1, in which oil is separated from the fibre faction by means of extraction.

7. A method as defined in claim 1, in which oil is separated from the inner portion remaining after the abrasion.

8. A method as defined in claim 7, in which a protein fraction and carbohydrate fraction of the core are separated from the residue remaining after the oil separation.

9. A method as defined in claim 1, in which the abrasion is performed in a mill equipped with millstones.

10. A method as defined in claim 1, in which the separated fibre fraction is bleached.

11. A method as defined in claim 10, in which the bleaching is performed with a bleaching solution containing water and alcohol.

12. A method as defined in claim 11, in which the alcohol is a C1–C5 alcohol.

13. A method as defined in claim 11, in which the alcohol amount is 2–5 times the amount of fibre fraction (w/w).

14. A method as defined in claim 11, in which the bleaching solution also contains hydrogen peroxide, in an amount of 2–7%.

15. A method as defined in claim 11, in which the fibre fraction is treated with an aqueous solution for 0.5–12 h before the treatment with the bleaching solution.

16. A method as defined in claim 15, in which the aqueous solution contains lipases or proteases.

17. A method as defined in claim 15, in which a slurry is obtained from the water treatment, and is mixed with said alcohol in order to perform bleaching.

18. A method as defined in claim 14, in which the hydrogen peroxide is added to said aqueous solution.

19. A method as defined in claim 10, in which the fibre fraction is thermally treated before the bleaching for 0.5–2 h, at a temperature of 40–80° C.

* * * * *